United States Patent [19]

Yamauchi

[11] Patent Number: 5,047,704
[45] Date of Patent: Sep. 10, 1991

[54] MOTOR CONTROL APPARATUS AND MOTOR CONTROLLING METHOD

[75] Inventor: Satomi Yamauchi, Aichi, Japan

[73] Assignee: Mitsubishi Denki Kabushiki Kaisha, Tokyo, Japan

[21] Appl. No.: 545,180

[22] Filed: Jun. 28, 1990

[30] Foreign Application Priority Data

Oct. 23, 1989 [JP] Japan .................................. 1-273667

[51] Int. Cl.[5] .......................................... H02P 5/402
[52] U.S. Cl. .................................. 318/801; 318/808; 318/800
[58] Field of Search ............... 318/800, 801, 802, 803, 318/807, 808, 811

[56] References Cited

U.S. PATENT DOCUMENTS

| | | | |
|---|---|---|---|
| 4,426,610 | 1/1984 | Kawada et al. | 318/798 |
| 4,451,771 | 5/1984 | Nagase et al. | 318/800 |
| 4,532,464 | 7/1985 | Igarashi et al. | 318/807 |
| 4,628,475 | 12/1986 | Azusawa et al. | 318/811 X |
| 4,808,903 | 2/1989 | Matsui et al. | 318/800 |
| 4,939,437 | 7/1990 | Farag et al. | 318/806 X |

FOREIGN PATENT DOCUMENTS 61-123698  8/1986  Japan.

Primary Examiner—Bentsu Ro
Attorney, Agent, or Firm—Rothwell, Figg, Ernst & Kurz

[57] ABSTRACT

In a motor control apparatus and a motor controlling method, when a connector is disconnected while an operation signal is ON, an excitation current component signal becomes zero and does not reach a predetermined value even after a predetermined period of time. In this case, a current component signal discriminating circuit discriminates that an amplitude of the excitation current component signal is equal to or less than the predetermined value, a timer issues an alarm signal because the predetermined period has passed from input of the operation signal, and a stop circuit stops operation of an inverter upon reception of the alarm signal, so that the inverter is prevented from breakdown.

5 Claims, 4 Drawing Sheets

MOTOR CONTROL APPARATUS AND MOTOR CONTROLLING METHOD

BACKGROUND OF THE INVENTION

1. Field of the Invention

The present invention relates to a motor control apparatus and particularly to protection of an inverter used to operate a motor as part of the apparatus.

2. Description of the Prior Art

FIG. 1 is a block diagram of a motor control apparatus of the prior art disclosed, for example, in Japanese Published Patent No. 63-274390 and Japanese Laid-open Patent No. 61-10983. In this figure, the letters R, S, T designate a 3-phase AC power supply. The numeral 2 designates an AC/DC converter connected to the AC power supply R,S,T and is controlled to generate a DC output voltage; 3 is a smoothing capacitor for smoothing an output of the converter 2; 4 is, a recovery control circuit including a resistor and a switch element and connected in parallel with capacitor 3; 5 is a PWM inverter which is connected to both ends of the smoothing capacitor 3 and is formed by transistors and diodes to generate AC outputs 5a to 5c of variable voltage and variable frequency by through pulse width modulation (PWM); 6 is a 3-phase induction motor which is driven by an output of the inverter 5; 7 is, a speed detector which is connected in directly to the motor 6 to generate the speed signal 7a in proportion to the rotational speed of motor 6; 8 is a load which is driven by the motor 6; 12–14 are current transformers for generating current feedback signals 12a–14a corresponding to the primary current of each phase of motor 6; 15 is, a coordinate converting circuit having a 3-phase/2-phase converting circuit for inputting a sine wave signal 21a and cosine wave signal 21b and converting the current feedback signals 12a–14a to an excitation current component signal 15a and torque current component signal 15b on a coordinate axis system which rotates in synchronization with the angular speed of the secondary magnetic flux vector of motor 6; 16 is, a divider; 17 is, a coefficient multiplying circuit for generating a slip frequency signal 17a by multiplying an input signal by a coefficient; is a normal rotation amplifier of a gain P (corresponding to the number of poles of motor 6) to which the speed signal 7a, is inputted; 19 is adder for generating a synchronous angular speed signal 19a by adding the slip frequency signal 17a to an output signal of the normal rotation amplifier 18; 20, is an integrator for generating a phase angle signal 20a of a secondary magnetic flux vector by integrating the synchronous angular speed signal 19a; 21 is a function generator for inputting the phase angle signal 20a and generating a corresponding sine wave signal 21a and a cosine wave signal 21b; 22 is a subtractor for generating an excitation current deviation signal by subtracting the excitation current component signal 15a from an excitation current component command value 23; 24 is an excitation current control circuit which is formed by lag/lead circuit and operates to cause the output of subtractor 22 to become zero; 24a is an excitation voltage component command value; 25 is a subtractor for generating a deviation signal by subtracting the speed signal 7a from a speed command value 26; 27 is a speed control circuit which is formed by a lag/lead circuit and operates to cause the output of the subtractor 25 to become zero; 27a is a torque current component command value; 28 is subtractor for generating a torque current deviation signal by subtracting a torque current component signal 15b from the torque current component command value 27a; 29 is a torque current control circuit which is formed by a lag/lead circuit and operates to cause the output of subtractor 28 to become zero; 29a is a torque voltage component command value; 30 is a coordinate converting circuit having a 2-phase/3-phase converting circuit for inputting sine wave signal 21a and cosine wave signal 21b and converting the excitation voltage component command value 24a and torque voltage component command value 29a into primary voltage command values 30a to 30c of each phase, which are inputted to PWM inverter 5.

The numeral 31 designates a printed circuit board on which the coordinate converting circuit A 15 through AND gate 39 are incorporated a microcomputer which constitutes the coordinate converting circuit A 15 through the coordinate converting circuit B 30; 33 is a connector for connecting conductors of current feedback signals 12a–14a to the printed wiring board 31; 34 is an overcurrent detecting circuit for detecting the current of 3-phase induction motor 6 and cutting off the PWM inverter 5 when an overcurrent flows; 35 is an overcurrent trip signal; 36 is an operation signal; 37 is an alarm signal outputted from the microcomputer 32; 38 is a gate ON signal which becomes active in the case where the motor is to be driven by the PWM inverter 5; 39 is an AND gate for setting the gate ON signal 38 to HIGH only when the overcurrent trip signal 35 is LOW, an operation signal 36 is HIGH and an alarm signal 37 is LOW.

Next, operation of the motor control apparatus of the prior art will be explained hereunder.

In FIG. 1, the 3-phase AC inputs R, S, T are rectified by the converter 2, and a DC voltage smoothed by the smoothing capacitor 3 is applied to the PWM inverter 5.

The PWM inverter 5 performs switching operations based on the primary voltage command values 30a to 30c. Thereby the AC outputs 5a–5c of variable voltages and variable frequencies are applied to the 3-phase induction motor 6 for rotation of the motor.

To start operation, the operation signal 36 is set to a HIGH level, the speed command value 26 is outputted and the AC outputs 5a–5c are applied to the 3-phase induction motor 6 to start motor rotation.

In this case, the excitation current component signal 15a is controlled to be matched with the excitation current component command value 23.

Moreover, the torque current component signal 15b is also controlled, in the same way, to be matched with the torque current component command value 27a. When the speed is to be lowered, such control is carried out so that the speed command value 26 is reduced, the 3-phase induction motor 6 lowers its speed and the speed command value 26 is matched with the speed signal 7a. When the operation signal 36 is made LOW the AC outputs 5a–5c become OFF and the 3-phase induction motor 6 stops.

Since the motor control apparatus of the prior art is constituted as explained above, if connector 33 is disconnected, for example, the current feedback signals 12a–14a are no longer applied to the coordinate converting circuit A 15 and thereby the excitation current component signal 15a and torque current component signal 15b become zero. Therefore, since control is carried out so that the excitation current component command value 23 is matched with the excitation current component signal 15a through the operation of excitation current control circuit 24, the excitation voltage command value 24a increases. Similarly, since control is carried out in the torque current control circuit 29 so that the torque current component command value 27a is matched with the torque current element signal 15b, the torque voltage component command value 29a also increases.

Thereby, there rises a problem that the primary voltage command values 30a-30c increase, a current of the PWM inverter 5, and thus the current of the 3-phase induction motor 6, increase according to a time constant and finally the transistors within the PWM inverter 5 break down because such current exceeds the rated current of the transistors.

To solve these problems, a protection apparatus as disclosed in Japanese Laid-open Patent No. 61-123698 has been proposed. Namely, when a detected current of the current detector for detecting an output current of a inverter becomes lower than a preset value, operation of the inverter is inhibited by the operation inhibiting means of an inverter control apparatus and thereby a fault of transistor in a an inverter can be detected quickly and thereby a safer motor driving system can be obtained.

However, this prior art apparatus detects a transistor fault of the inverter at an early stage by stopping the operation of the apparatus when a detected current of a current detector for detecting an output current of the inverter becomes lower than a preset value, but simultaneously causes a problem in that it requires complicated circuits such as rectifying circuits, adding circuits, and discriminating circuits as indicated in FIG. 3 of the Japanese Laid-open Patent No. 61-123698 in order to process AC waveforms including ripples and also exhibits difficulty in the setting of values.

Moreover, the apparatus of the prior art further causes a problem that since a detected current value of the current detector becomes lower than a preset value for a certain period of time immediately after apply application of an operation signal because of the time constant of the motor motor which must elapse before the current can rise, the motor may stop immediately after reception of the operation signal because the detected current falls in the operation inhibit region.

SUMMARY OF THE INVENTION

The present invention has been devised to solve the problems described in above and it is therefore an object of the present invention to provide a safe and highly reliable motor control apparatus and method which ensure stable operation without breakdown of the PWM inverter 5 caused by, inter alia, disconnection of the connector 33, breakage of the wires for transmitting the current feedback signals 12a-14a, or fault of the current transformers 12-14 and, furthermore, without stoppage of the motor immediately after applying the operation signal.

In view of attaining the objects described above, the motor control apparatus of the present invention comprises: a current component signal discriminating means which discriminates whether an amplitude of excitation current component signal or torque current component signal is lower than than a predetermined value or not and which includes a timer for outputting an alarm signal after a predetermined period from the time when such amplitude has been lower than the predetermined level and the operation signal has been applied; and a stop means for stopping operation of the, inverter apparatus based on the alarm signal outputted from the current component signal discrimination means.

The motor control method of the present invention comprises steps of: detecting a start of operation of the inverter apparatus for driving the motor; detecting an AC current supplied to the motor to make coordinate-conversion into an excitation current component signal and a torque current component signal; discriminating whether one of both component signals is lower than a predetermined value or not; and stopping the operation of the inverter apparatus in case the component signal is lower than the predetermined value and a certain period of time has passed from the start of operation.

The aforementioned and other objects and novel features of the present invention will become apparent from the following detailed description with reference to the accompanying drawings.

DETAILED DESCRIPTION OF THE PREFERRED EMBODIMENTS

Figure 1:
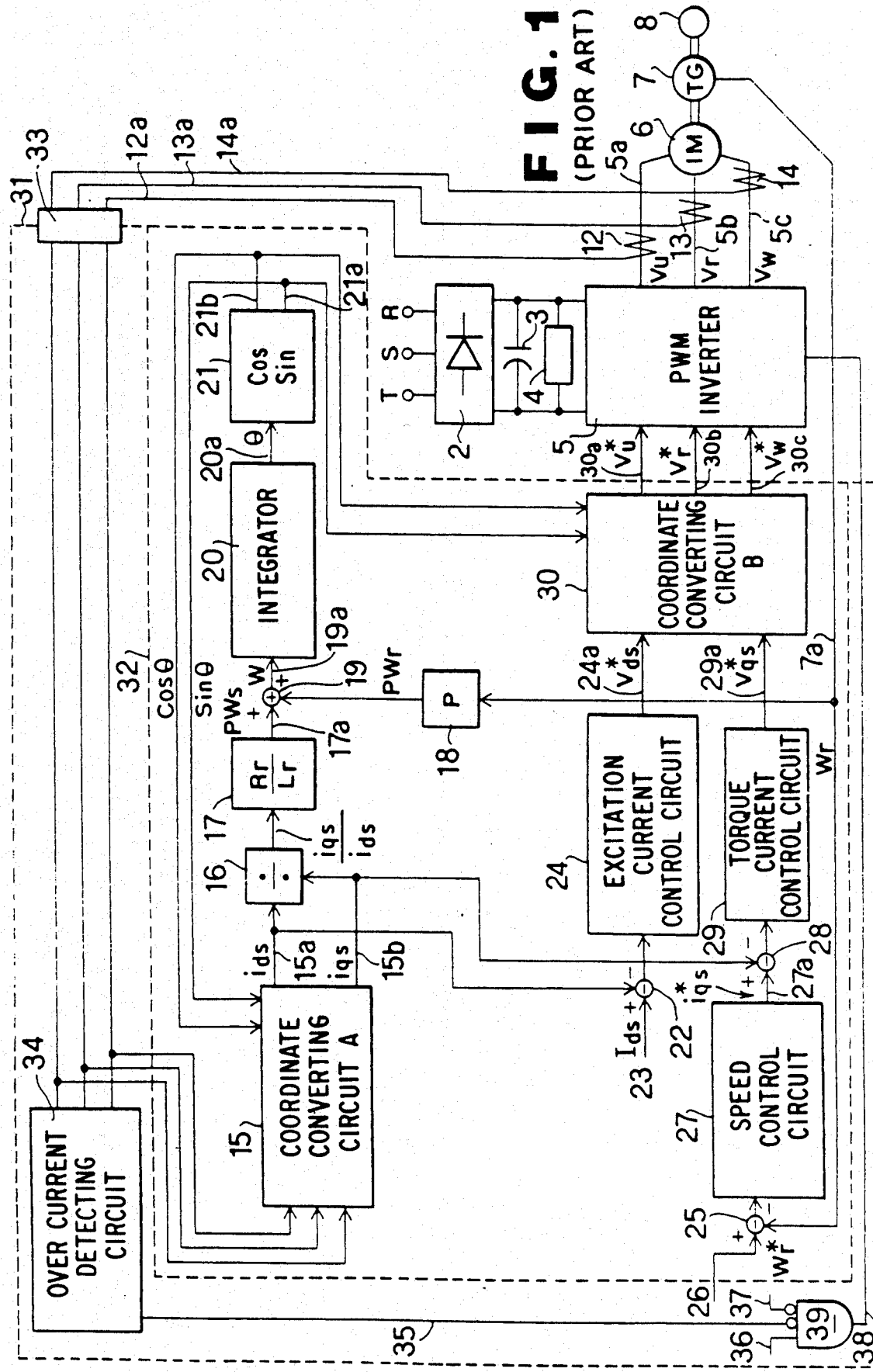
FIG. 1 is a block diagram of a motor control apparatus of the prior art.
Figure 2:
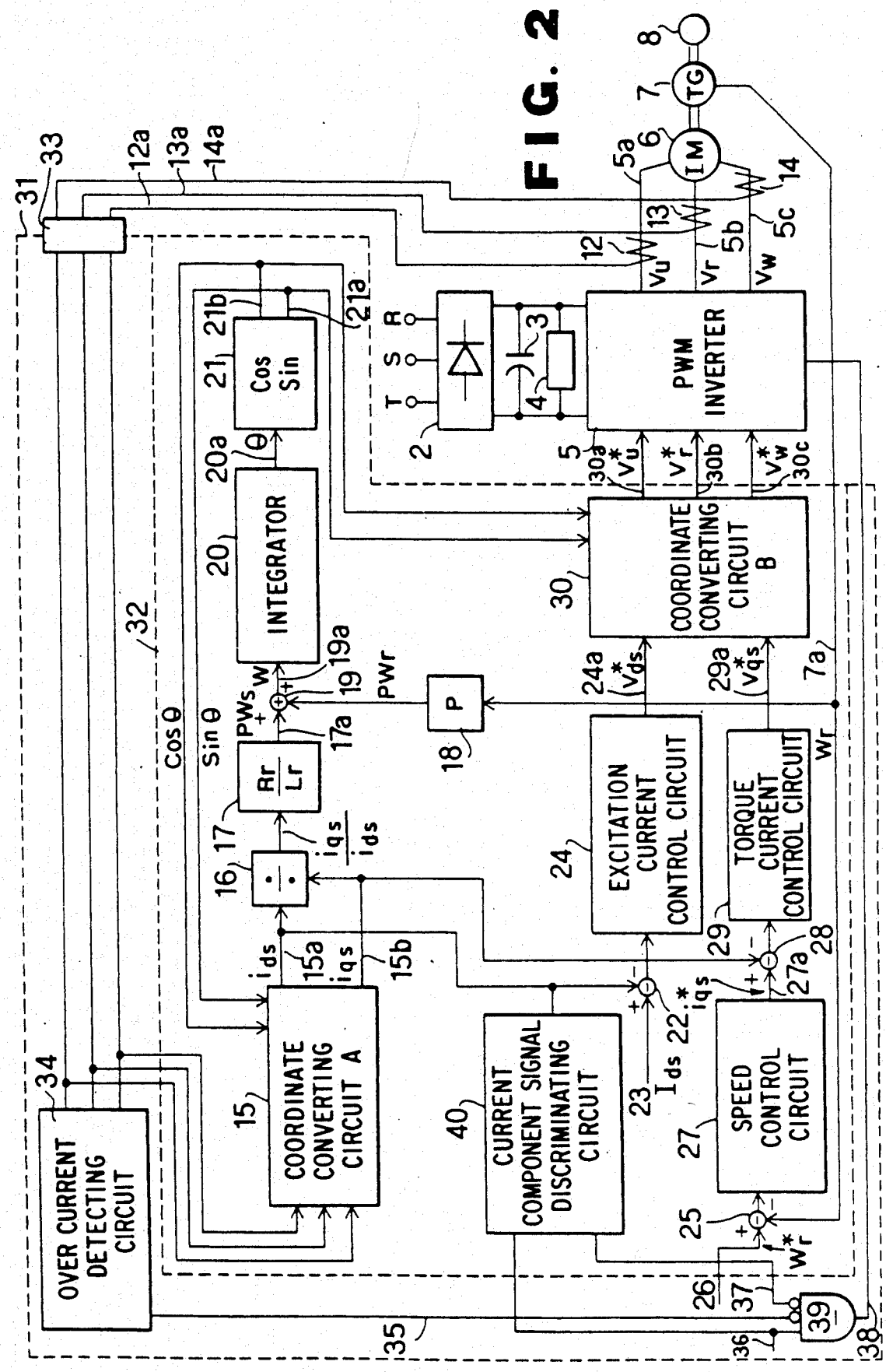
FIG. 2 is a block diagram of the motor control apparatus of one embodiment of the present invention.

FIG. 2 is a block diagram indicating an embodiment of the present invention. In this figure, like elements are given the same reference numerals as FIG. 1 and explanation therefore is not given. The numeral 40 designates a current component signal discriminating circuit which comprises a timer for inputting an operation signal 36 and an excitation current component signal 15a and monitoring whether a predetermined period has elapsed from the time when the operation signal 36 has become a high level, and which outputs an alarm signal 37 when an amplitude of the excitation current component signal 15a becomes lower than a predetermined value after the predetermined period has elapsed; 39 is an AND gate which stops operation of the PWM inverter 5 by outputting a gate signal 38 of low level to the PWM inverter 5 when the overcurrent trip signal 35 or the alarm signal 37 from the current component signal discriminating circuit 40 are inputted at the input terminals thereof.

Figure 3:
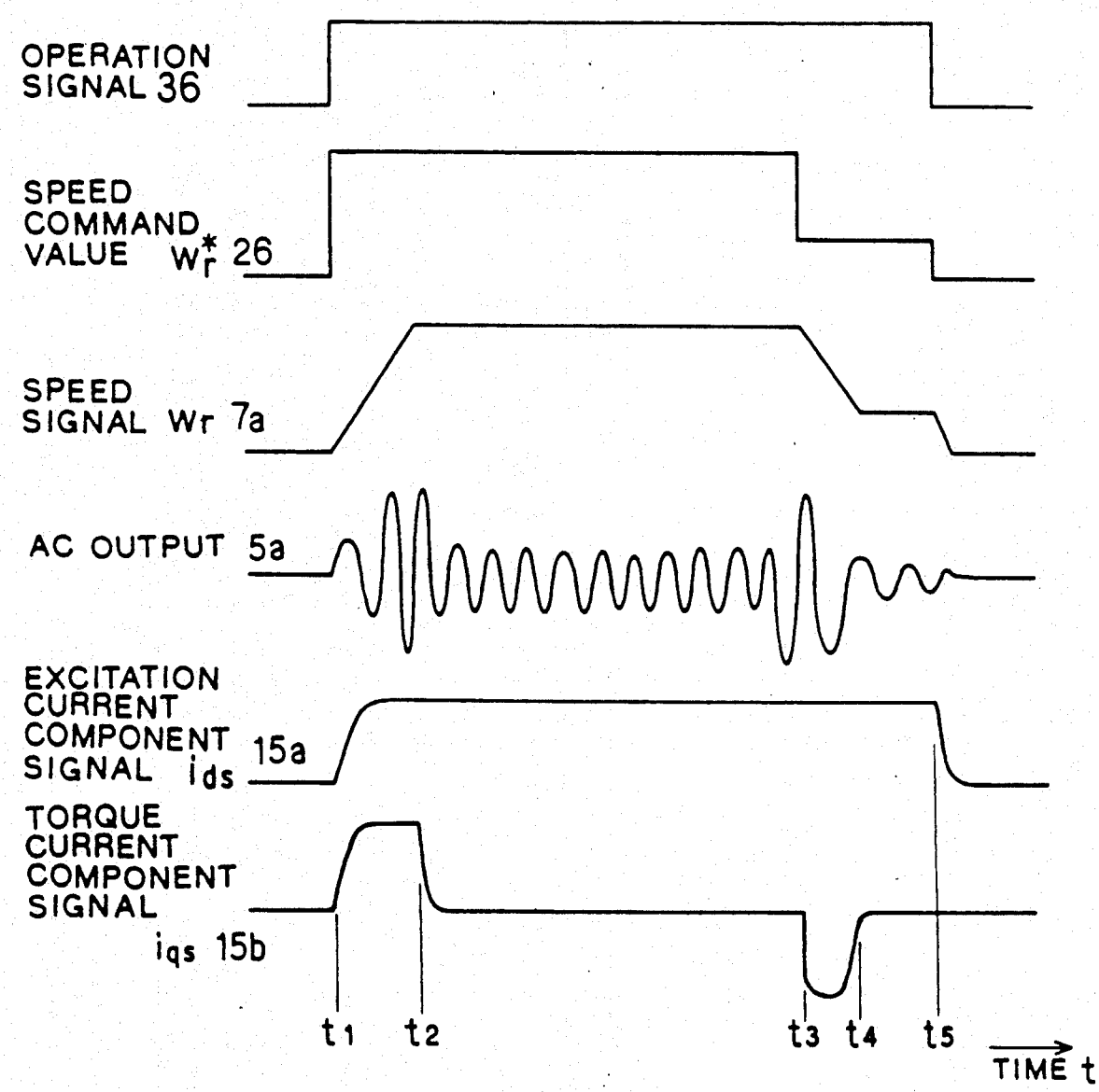
FIG. 3 is a timing chart indicating operation of the embodiment of FIG. 2.

Next, operation of the embodiment will be explained. FIG. 3 shows principal signal waveforms during operation.

In this figure, when operation iu to be started, the operation signal 36 is set to HIGH level at the time $t_1$. At this time, the speed command value 26 is also applied and the AC outputs 5a to 5c are applied to the 3-phase induction motor 6. At this time, the excitation current component signal 15a is controlled to match the excitation current component command value 23.

Moreover, the torque current component signal 15b is also controlled to match the torque current component command value 27a in the same way.

Next, after the speed command value 26 matches the speed signal 7a at the time $t_2$, the torque current component command value 27a is reduced, causing the torque current component signal 15b to decrease.

Next, when the speed command value 26 is reduced at the time t₃, the 3-phase induction motor 6 lowers its operation speed and the speed command value 26 matches the speed signal 7a at the time t₄.

Thereafter, when the operation signal 36 becomes LOW level at the time t₅, the AC outputs 5a–5c become OFF and the 3-phase induction motor 6 stops.

In such operation, if the connector 33 is disconnected while the operation signal 36 is ON, the excitation current component signal 15a outputted from the coordinate converting circuit A 15 becomes zero and it does not reach the predetermined value even after the predetermined period has elapsed from application of the operation signal 36. The current element signal discriminating circuit 40 then decides that the amplitude of the current is lower than the predetermined value based on the excitation current component signal 15a being zero. Moreover, the timer of the current component signal discriminating circuit 40 counts whether the predetermined period has elapsed after inputting of the operation signal 36. Therefore, the current component signal discriminating circuit 40 outputs an alarm signal 37 to the AND gate 39 in case the predetermined period has passed from input of the operation signal 36 and the amplitude of excitation current component signal 15a is decided to be the predetermined value or lower. The output signal 38 of AND gate 39 then becomes low to stop operations of PWM inverter 5. Therefore, the current outputs 5a to 5c of PWM inverter 5 become zero and the transistors of PWM inverter 5 do not exceed the rated current and breakdown of the transistors is prevented. Since the timer is provided, the alarm signal 37 is not outputted from the current component signal discriminating circuit 40 until the predetermined period has elapsed from inputting of the operation signal 36. Therefore, even when there is an interval of time during which the excitation current component signal 15a does not reach the predetermined value due to the time constant of motor 6 for the predetermined period after inputting of the operation signal 36, the alarm signal 37 is not outputted because the current component signal discriminating circuit 40 discriminates that the , excitation current component signal 15a becomes higher than the predetermined value after the predetermined period has elapsed from the application of the operation signal 36.

In the above embodiment, the current component signal discriminating circuit 40 discriminates the excitation current component signal 15a, however, it is also possible for to discriminate the torque current component signal 15b.

Figure 4:
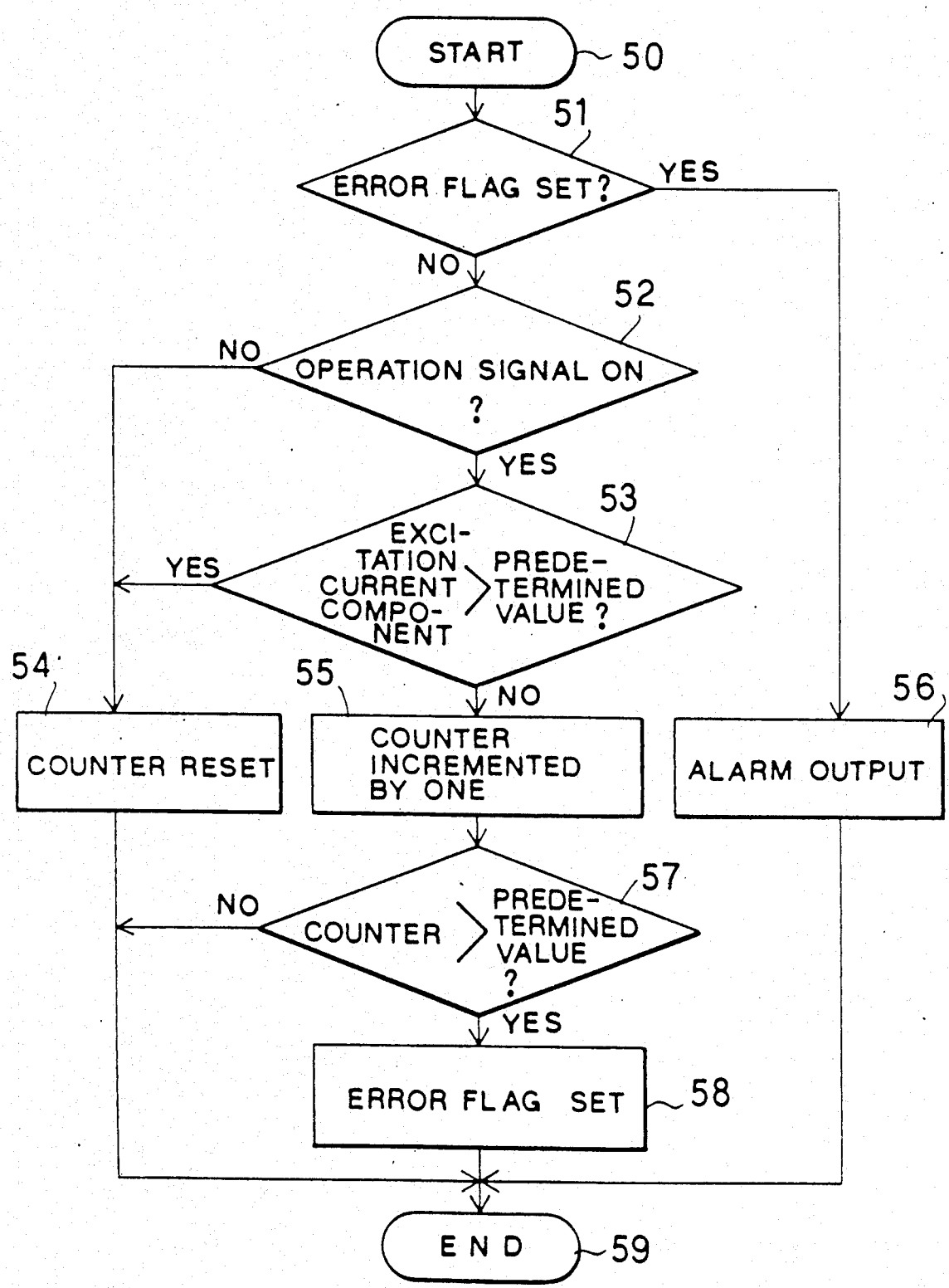
FIG. 4 is a flow chart indicating a software structure of the embodiment of FIG. 2.

Operations of preferred embodiment have been explained above on the basis of the hardware structure, and operations of the software structure which is equivalent to the hardware structure will then be explained hereunder on the basis of the flow chart of FIG. 4.

When operation starts (step 50), it is decided whether an error flag is set or not step 51). When the error flag is set, an alarm signal is outputted (step 56). When the error flag is not set, it is decided whether the operation signal 36 is ON or not step 52). If the operation signal 36 does not become ON, a counter is cleared (step 54). When the operation signal 36 is ON, it is decided whether the excitation current component signal (15a) exceeds the predetermined value or not (step 53). When the excitation current component signal (15a) exceeds the predetermined value, the counter is cleared (step 54). Moreover, when the excitation current component signal 15a is equal to or less than the predetermined value, the counter is incremented by one (step 55). Next, when an incremented value of the counter exceeds the predetermined period value (step 57), the error flag is set (step 58) and the operation stops. When the value of the counter is equal to or less than the predetermined value (step 57), the operation is continued under the normal condition.

The excitation current component signal ids and torque component signal iqs obtained by the coordinate conversion are of DC values respectively. Therefore, these can be compared easily with the set values by only utilizing outputs of the coordinate converting circuit (or software for coorinate conversion) of a vector control type, without requiring a complicated circuit.

Moreover, it is sufficient for the predetermined period after inputting of the operation signal 36 is set to be between the times when the active voltage of inverter determined by current capacity of the inverter transistors the main circuit voltage and the time constant of the motor, and the motor current as the excitation current component signal 15a or torque current component signal 15b increase up to respective predetermined values.

As described above, the present invention provides the following effects: Since the inverter apparatus stops operation only when the excitation current component signal or torque current component signal becomes equal to or less than the predetermined value after the predetermined period has elapsed from input of the operation signal, the inverter apparatus is not stopped even if the excitation current component signal or torque current component signal becomes equal to or less than the predetermined value due to the time constant of the motor within the predetermined period, and the inverter apparatus is stopped when the excitation current component signal or torque current component signal becomes equal to or less than the predetermined value due to disconnection of the connector, failure of current transformer or breakage of wires for current feedback signal only after passing the predetermined period ensuing from input of the thus breakdown of transistors of the inverter apparatus can be prevented and a safe and reliable motor control apparatus can be attained.

What is claimed is:

1. A motor control apparatus, comprising:
  an inverter for outputting a.c. power for driving a motor;
  current detector means for detecting a current of said motor;
  conversion means for converting the current detected by said current detector means into an excitation current component and a torque current component;
  control means for controlling operation of said inverter by comparing said excitation current component and said torque current component with an excitation current command value and a torque current command value, respectively, and developing a voltage command for said inverter;
  current component discriminating means for discriminating whether at least one of said excitation current component and said torque current component is less than or equal to a predetermined value, and outputting an alarm signal if at least one of said excitation current component and said torque current component is less than or equal to said predetermined value upon expiration of a predetermined time period after inputting of an operation signal for starting operation of said inverter; and stopping means for halting operation of said inverter in response to said alarm signal.

2. A motor control apparatus according to claim 1, wherein said current component discriminating means includes timer means responsive to the inputting of said operation signal for determining the expiration of said predetermined time period.

3. A motor control apparatus according to claim 1, wherein said current component discriminating means utilizes d.c. values in its current discrimination.

4. A method of controlling operation of a motor, comprising the steps of:
- outputting a.c. power for driving a motor from an inverter;
- detecting a current of said motor;
- converting the detected current into an excitation current component and a torque current component;
- controlling operation of said inverter by comparing said excitation current component and said torque current component with an excitation current command value and a torque current command value, respectively, and developing a voltage command for said inverter;
- discriminating whether at least one of said excitation current component and said torque current component is less than or equal to a predetermined value, and outputting an alarm signal if at least one of said excitation current component and said torque current component is less than or equal to said predetermined value upon expiration of a predetermined time period after inputting of an operation signal for starting operation of said inverter; and
- halting operation of said inverter in response to said alarm signal.

5. A method of controlling operation of a motor, comprising the steps of:
a) determining the existence of an error flange and outputting an alarm signal for disabling an inverter if the error flag exists;
b) determining the application of an operation signal if said error flag does not exist;
c) clearing a counter in the absence of said operation signal;
d) driving a motor with a.c. power from said inverter upon application of said operation signal;
e) comparing an excitation current of the motor with a predetermined value;
f) incrementing said counter if said excitation current is less than or equal to said predetermined value, and resetting said counter if said excitation current is greater than said predetermined value;
g) comparing the contents of said counter with a predetermined count value upon incrementing said counter;
h) generating said error flag if the contents of said counter exceed said predetermined count value; and
i) returning to step a).

* * * * *

UNITED STATES PATENT AND TRADEMARK OFFICE
CERTIFICATE OF CORRECTION

PATENT NO. : 5,047,704

DATED : Sept. 10, 1991

INVENTOR(S) : Satomi Yamauchi

It is certified that error appears in the above-identified patent and that said Letters Patent is hereby corrected as shown below:

```
Column 1, line 19, after "is" delete the comma ",";
         line 25, delete "by";
         line 27, after "is" delete the comma ",";
         line 28, after "the" insert --output shaft of--;
         line 29, "the" (first occurrence) should be --a--;
         line 33, after "is" delete the comma ",";
         line 41, after "is" (first occurrence) delete the comma ",";
         line 41, after "is" (second occurrence) delete the comma ",";
         line 44, after "coefficient;" insert --18--;
         line 46, after "is" (second occurrence) insert --an--;
         line 49, after "20" delete the comma ",";
         line 63, before "deviation" insert --motor speed--.

Column 2, line 16, after "incorporated" insert --; 32 is--;
         line 57, after "LOW" insert a comma --,--.

Column 3, line 23, "of" should be --in a--;
         line 23, "in a" should be --of--;
         line 40, delete "apply";

Column 4, line 1, after "the" delete the comma ",";
         line 55, "iu" should be --is--.

Column 5, line 43, after "the" delete the comma ",";
         line 50, after "for" insert --it--;
         line 52, after "of" insert --one--;
         line 58, "step" should be --(step--;
         line 61, "step" should be --(step--.
```

UNITED STATES PATENT AND TRADEMARK OFFICE
CERTIFICATE OF CORRECTION

PATENT NO. : 5,047,704

DATED : Sept. 10, 1991

INVENTOR(S) : Satomi Yamauchi

It is certified that error appears in the above-identified patent and that said Letters Patent is hereby corrected as shown below:

Column 6, line 14, "coorinate" should be --coordinate--;
        line 20, after "tors" insert a comma --,--;
        line 41, "signal" should be --signals--;
        line 42, "ensuing from input of the" should be --and--.

Column 8, line 9, "flange" should be --flag--.

Signed and Sealed this

Eighteenth Day of May, 1993

*Attest:*

MICHAEL K. KIRK

*Attesting Officer*     *Acting Commissioner of Patents and Trademarks*